US005953532A

United States Patent [19]
Lochbaum

[11] Patent Number: 5,953,532
[45] Date of Patent: Sep. 14, 1999

[54] INSTALLATION AND DEINSTALLATION OF APPLICATION PROGRAMS

[75] Inventor: Mark Allan Lochbaum, Springdale, S.C.

[73] Assignee: NCR Corporation, Dayton, Ohio

[21] Appl. No.: 08/779,853

[22] Filed: Jan. 3, 1997

[51] Int. Cl.[6] .................................................. G06F 9/445
[52] U.S. Cl. ........................................ 395/712; 705/500
[58] Field of Search .................................. 345/352, 340, 345/336, 333; 395/200.49, 113, 114, 101, 500, 750.06, 701, 677, 704, 682; 702/186; 707/507, 201; 711/100; 705/500

[56] References Cited

U.S. PATENT DOCUMENTS

| | | | |
|---|---|---|---|
| 4,924,378 | 5/1990 | Hershey et al. | 395/187.01 |
| 5,146,556 | 9/1992 | Hullot et al. | 345/348 |
| 5,170,465 | 12/1992 | McKeeman et al. | 395/707 |
| 5,226,117 | 7/1993 | Miklos | 345/356 |
| 5,228,123 | 7/1993 | Heckel | 345/334 |
| 5,280,613 | 1/1994 | Chan et al. | 395/707 |
| 5,305,435 | 4/1994 | Bronson | 345/351 |
| 5,327,529 | 7/1994 | Fults et al. | 345/335 |
| 5,347,626 | 9/1994 | Hoeber et al. | 345/354 |
| 5,347,628 | 9/1994 | Hoeber et al. | 345/354 |
| 5,349,661 | 9/1994 | Brewer et al. | 395/651 |
| 5,386,564 | 1/1995 | Shearer et al. | 707/539 |
| 5,392,386 | 2/1995 | Chalas | 205/437 |
| 5,394,521 | 2/1995 | Henderson, Jr. et al. | 345/346 |
| 5,428,730 | 6/1995 | Baker et al. | 345/335 |
| 5,430,872 | 7/1995 | Dahod et al. | 707/104 |
| 5,430,878 | 7/1995 | Straub et al. | 395/712 |
| 5,437,027 | 7/1995 | Bannon et al. | 707/103 |
| 5,442,759 | 8/1995 | Chiang et al. | 705/1 |
| 5,455,919 | 10/1995 | Brewer et al. | 395/681 |
| 5,465,362 | 11/1995 | Orton et al. | 395/677 |
| 5,465,540 | 11/1995 | Powers, III et al. | 345/336 |
| 5,499,334 | 3/1996 | Staab | 345/340 |
| 5,668,997 | 9/1997 | Lynch-Freshner et al. | 395/683 |
| 5,737,557 | 4/1998 | Sullivan | 395/340 |
| 5,754,178 | 5/1998 | Johnston, Jr. et al. | 345/343 |
| 5,768,566 | 6/1998 | Harikrishnan et al. | 395/500 |

OTHER PUBLICATIONS

Microsoft Corporation, "*Introducing Microsoft Windows 95*", © 1981–1995 Microsoft Corporation, pp. xiv, xv, and 35.

*Primary Examiner*—Tariq R. Hafiz
*Assistant Examiner*—Antony Nguyen-Ba
*Attorney, Agent, or Firm*—Gates & Cooper

[57] ABSTRACT

A method, apparatus, and article of manufacture for a computer implemented method of installing and deinstalling Windows™ application programs. The present invention provides two windows. The first window displays application programs that can be installed. The second window displays application programs that have been installed. When a user drags and drops an application program from the first window to the second window, the application program is installed. Similarly, when the user drags and drops an installed application program from the second window to the first window, the application program is deinstalled.

21 Claims, 5 Drawing Sheets

FIG. 5

INSTALLATION AND DEINSTALLATION OF APPLICATION PROGRAMS

BACKGROUND OF THE INVENTION

1. Field of the Invention

This invention relates in general to a system for installing and deinstalling an application program, and in particular to installing and deinstalling an application program using drag and drop operations.

2. Description of Related Art

Installation of application programs on Microsoft Windows™ Platforms (e.g., Windows™ 3.X, Windows 95™, and Windows NT™) typically involves running a single executable file, usually called SETUP.EXE. The SETUP.EXE program is a standard installation program that comes with an application program. It is created with various tools including those found in Development Kits sold by Microsoft Corporation.

The SETUP.EXE program creates directories, copies files, and modifies configuration files (e.g., AUTOEXEC.BAT, CONFIG.SYS, and WIN.INI files). The SETUP.EXE program also determines many hardware configuration parameters (e.g., number of drives, drive sizes, free space on drives, and processor type) and software parameters (e.g., Windows™ version, Windows™ path, and number of buffers). The SETUP.EXE program typically determines these parameters by requesting information from the user through the use of dialog boxes containing various controls. It can be very time consuming for the user to have to input all of this information each time an application program is installed.

Moreover, to prepare an application for installation, application programs sometimes are imported. The process for importing application programs includes several steps. Typically, it is a very complicated process, and so it is time consuming for a user (e.g., a network administrator) to perform all of the steps.

After a user has completed work using an installed application program, the user may want to deinstall the application program. Typically, deinstallation removes the application program but must be careful not to remove any user data that was created by the application program or in the application program's file directories. Unfortunately there is no guarantee that a SETUP.EXE program provides for deinstallation of the application program (i.e., what Microsoft calls uninstallation).

Therefore, there is a need for an improved method of installing and deinstalling Windows™ application programs.

SUMMARY OF INVENTION

To overcome the limitations in the prior art described above, and to overcome other limitations that will become apparent upon reading and understanding the present specification, the present invention discloses a method, apparatus, and article of manufacture for a computer implemented method of installing and deinstalling Windows™ application programs.

In accordance with this invention, two windows are provided. The first window displays application programs that can be installed. The second window displays application programs that have been installed. When a user drags and drops an application program from the first window to the second window, the present invention will automatically perform the steps required to install the application program.

During installation, the present invention performs the steps required to install the application program and uses an answer file to determine configuration parameters.

Similarly, to deinstall an application program, the user drags and drops an installed application program from the second window to the first window, and the present invention deinstalls the application program.

DETAILED DESCRIPTION OF THE PREFERRED EMBODIMENT

In the following description of the preferred embodiment, reference is made to the accompanying drawings which form a part hereof, and which is shown by way of illustration a specific embodiment in which the invention may be practiced. It is to be understood that other embodiments may be utilized as structural changes may be made without departing from the scope of the present invention.

Hardware Environment

Figure 1:
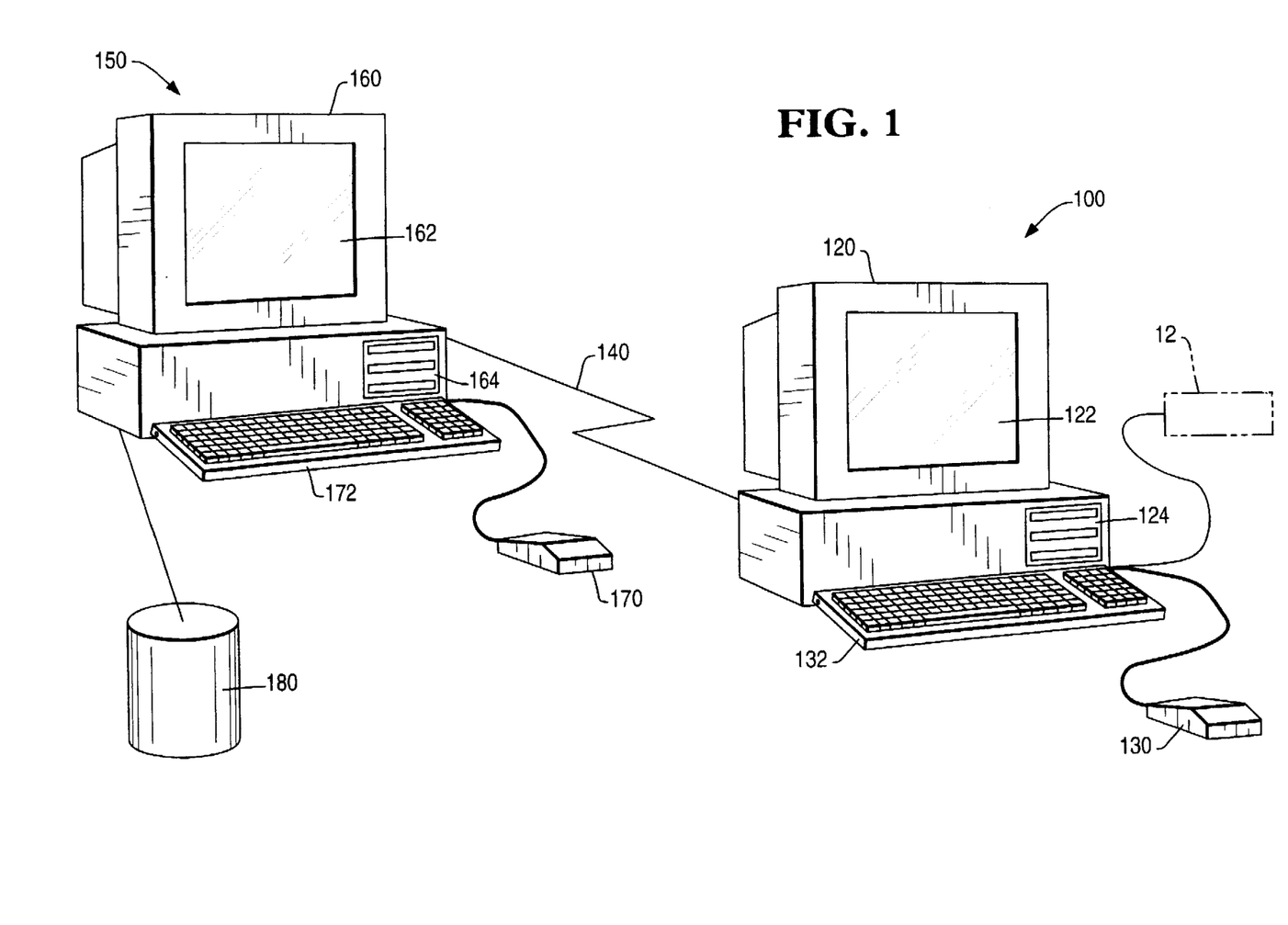
FIG. 1 is a block diagram that illustrates an exemplary hardware environment for the preferred embodiment of the present invention.

FIG. 1 illustrates an exemplary hardware environment used to implement the preferred embodiment of the present invention. The present invention is typically implemented using a computer 100, which generally includes, inter alia, a processor, random access memory (RAM), read only memory (ROM), a video card, bus interface, and/or other components. It is envisioned that attached to the computer 100 may be a monitor 120 (e.g., a CRT, an LCD display, or other display device), data storage devices 124, such as a hard disk, floppy, and/or CD-ROM disk drives, and peripherals 126, such as a printer. Also included in the preferred embodiment may be input devices, for example, a mouse pointing device 130 ("mouse") and a keyboard 132.

Those skilled in the art will recognize that any combination of the above components, or any number of different components, peripherals, and other devices, may be used with the computer 100.

The computer 100 operates under the control of an operating system 122, such as Windows™ or some other operating system, which is represented in FIG. 1 by the screen display on the monitor 120. The present invention is preferably implemented within a computer program stored in a data storage device 124, although it should be understood that, in the alternative, the principles of the invention may also be implemented within the operating system 122. In general, the routines executed to implement the present invention, whether implemented as part of an operating system or a specific application, will be referred to herein as "computer programs".

Additionally, the computer 100 (i.e., a client) may be connected to one or more other computers 150 (i.e., a server) via a network 140. The server computer 150, generally includes, inter alia, a processor, random access memory (RAM), read only memory (ROM), a video card, bus interface, and/or other components. It is envisioned that attached to the server computer 150 may be a monitor 160 (e.g., a CRT, an LCD display, or other display device) and data storage devices 164, 180 such as a hard disk, floppy, and/or CD-ROM disk drives. The data storage device 180 can contain application programs that can be installed at the client computer 100 and install files for installing those application programs. Also included at the server computer 150 may be input devices, for example, a mouse pointing device 170 and a keyboard 172. The server computer 150 operates under the control of an operating system 162, such as the Windows™ operating system or some other operating system, which is represented in FIG. 1 by the screen display on the monitor 160. Furthermore, when a user at the client computer 100 requests installation of an application program, the client computer 100 obtains the requested application program from the server computer 150.

Generally, the computer programs which implement the preferred embodiment of the invention are tangibly embodied in a computer-readable medium or carrier, e.g., one or more of the fixed and/or removable data storage data devices 124. Under control of operating system 122, the computer programs may be loaded from the data storage devices 124 into the memory of the computer 100. The computer programs comprise instructions which, when read and executed by computer 100, cause the computer 100 to perform the steps necessary to execute the steps or elements of the present invention.

Those skilled in the art will recognize that the exemplary environment illustrated in FIG. 1 is not intended to limit the present invention. Indeed, those skilled in the art will recognize that other alternative hardware environments may be used without departing from the scope of the present invention.

Overview

The installer/deinstaller program is a client/server based computer program. The client computer 100 currently runs under the Hewlett-Packard NewWave environment. However it is possible to develop an installer/deinstaller program that runs directly under the Windows™ environment. Typically, application programs to be installed reside at the server computer 150. When a user at the client computer 100 requests that an application program be installed, the client computer 100 transfers the application program from the server computer 150.

Figure 2:
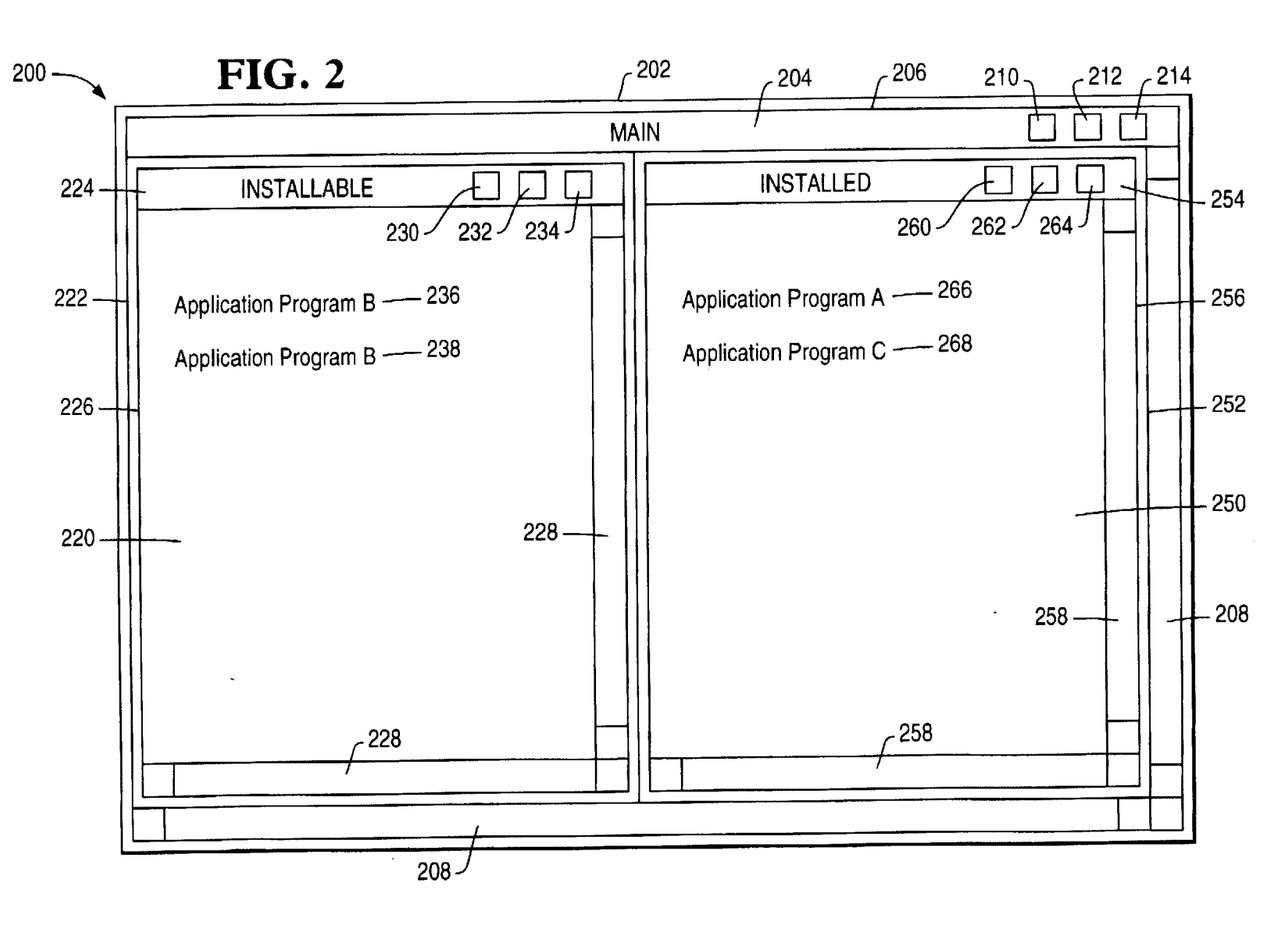
FIG. 2 is a block diagram of a computer generated display illustrating a user interface.

FIG. 2 is a block diagram of a computer generated display illustrating a user interface provided by the installer/deinstaller program. A user uses the user interface to indicate that an application program is to be installed or that it is to be deinstalled.

The user interface displays a main window 200 on a display device 122. The main window 200 has a frame 202, which is illustrative of a typical graphical user interface (GUI) frame for displaying a view, and includes several user interface mechanisms such as a title bar 204 (for repositioning), a border 206 (for resizing), scroll bars 208 (for scrolling), a minimize button 210, a maximize button 212, and a close button 214.

The main window has two child windows 220, 250. Each child window has a frame 222, 252, which is illustrative of a typical graphical user interface (GUI) frame for displaying a view, and includes several user interface mechanisms such as a title bar 224, 254 (for repositioning), a border 226, 256 (for resizing), scroll bars 228, 258 (for scrolling), a minimize button 230, 260, a maximize button 232, 262, and a close button 234, 264.

The first child window 220 lists the application programs 232, 234 the user may install at that computer 100. For example, a user at computer 100 can request installation of Application Program B 236 or Application Program D 238. Moreover, the first child window 220 lists only application programs the user at that computer 100 has access to and can install. The second child window 250 lists the application programs 266, 268 that have been installed by the user on the computer 100. For example, Application Program A 266 and Application Program C 268 have been installed at computer 100.

Figure 3:
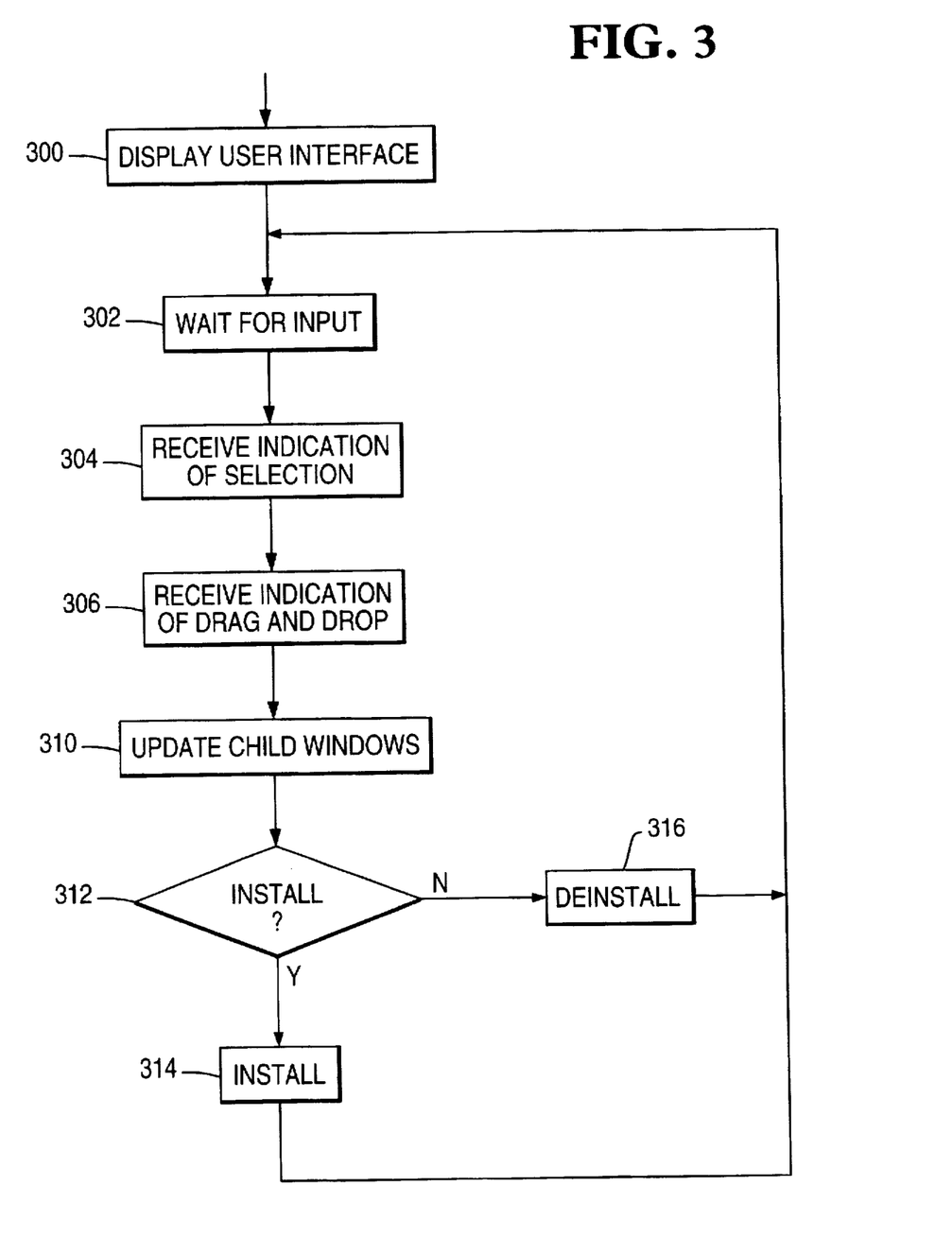
FIG. 3 is a flowchart illustrating the general logic of the installer/deinstaller program.

FIG. 3 is a flowchart illustrating the general logic of the installer/deinstaller program. Initially, in step 300, the installer/deinstaller program displays the user interface illustrated in FIG. 2. In step 302, the installer/deinstaller program waits for input from an input device, such as a mouse 130. In step 304, the installer/deinstaller program receives an indication that an application program has been selected. Selection of one or more application programs may be made in several known manners, such as by using various mouse/keyboard 130, 132 combinations to identify and highlight the application programs. For example, an application program can be selected by pointing at the application program using a mouse 130 and depressing the mouse button.

In step 306, the installer/deinstaller program receives an indication that the selected application program is being dragged and dropped from one child window to another child window. To drag and drop an application program, after selecting an application program from one child window, the user typically moves the mouse 130 to another child window and releases the mouse button to indicate that the application program is to be displayed in that child window. Next, the installer/deinstaller program updates the views of both child windows 220, 250 to reflect that the application program is displayed only in the child window to which it was dragged and dropped.

Step 312 is a decision step in which the installer/deinstaller program determines whether the received input indicates that an application program is to be installed or deinstalled. When an application program is to be installed, the installer/deinstaller program installs the application program in step 314. When an application program is to be deinstalled, the installer/deinstaller program deinstalls the application program in step 316.

In summary, to install an application program, the user selects an application program from the first child window 220 using an input device, such as a mouse 130, and drags the selected application program to the second child window 250 and drops the selected application program into the second child window 250. In order to deinstall an application program, the user selects an application program in the second child window 250 and drags and drops that installed application program from the second child window 250 to the first child window 220.

Figure 4:
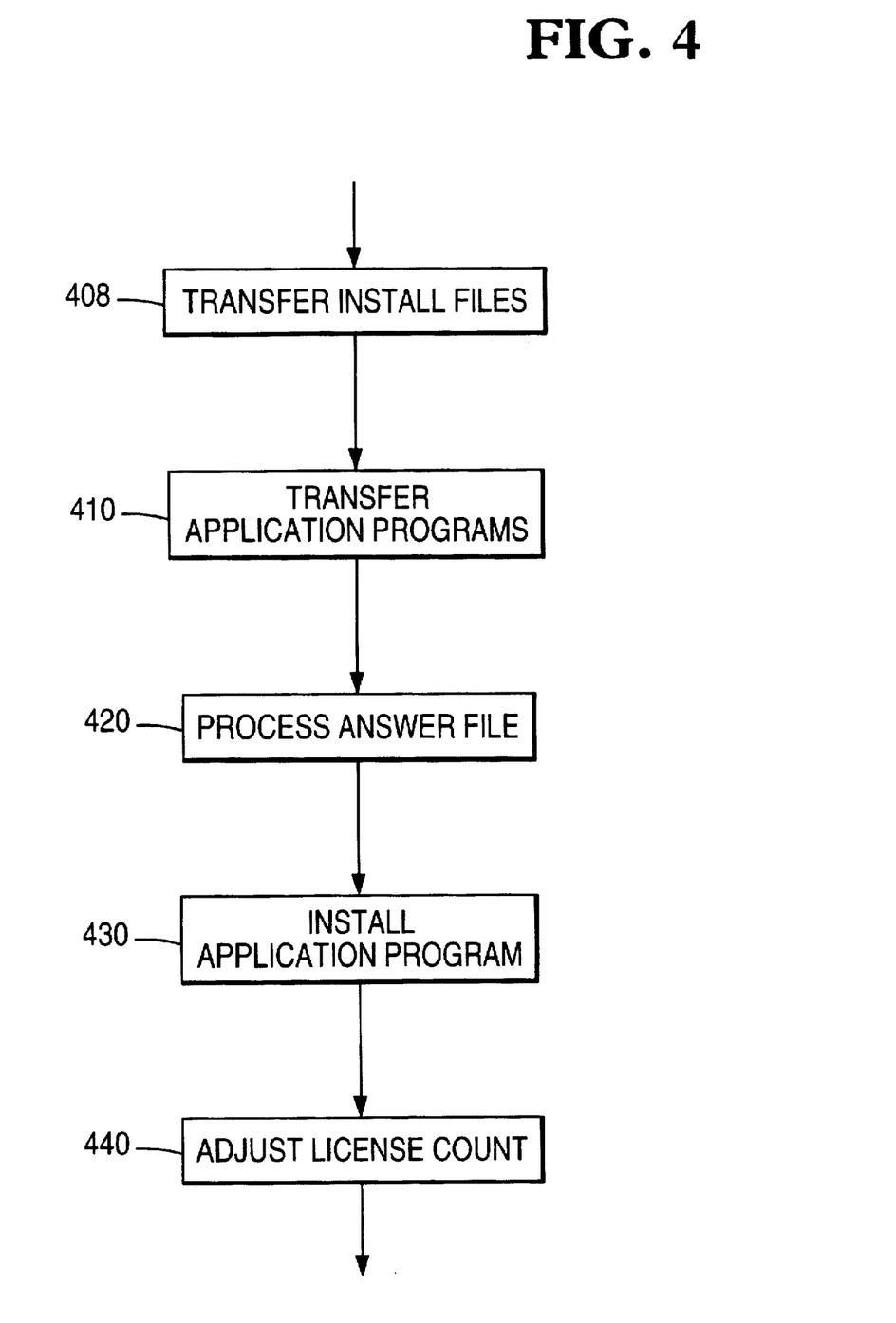
FIG. 4 is a flowchart illustrating the steps required to perform installation.

FIG. 4 is a flowchart illustrating the steps required to perform installation, as identified in step 314. Before an application program can be installed, the application program must be prepared for installation through the installer/deinstaller program. This preparation step is called importing the application program. The import process for a Windows™ application program has several steps. These steps may be performed in a different order, and many steps can be performed simultaneously with others. The import process involves transferring the files required to install the application program (i.e., the install files) from the install media (e.g., CD, Tape, or Flex Disk) to an area accessible by the client computer 100. In step 408, the installer/deinstaller program transfers the install files from the data storage device 180 coupled to the server computer 150 to the data storage device 124 coupled to the client computer 100. Security is enforced by encryption or by granting access to the commonly accessed area only for the time of installation. The import process also involves transferring the application program that is to be installed to an area accessible by the client computer 100. In step 410, the installer/deinstaller program transfers the application program from the data storage device 180 coupled to the server computer 150 to the data storage device 124 coupled to the client computer 100 on which the application program is to be installed. In one embodiment, the installer/deinstaller program includes an administration routine that performs the import steps.

Additionally, during installation of an application program, the installer/deinstaller program needs to obtain configuration and installation information. It obtains this information from an answer file.

The answer file contains some user-specific fields, such as the name of the user, and some computer-specific fields, such as the name of the computer, the number of disks available, the directory structure, and the processor type. This data is typically known by the network administrator and is usually available over the network or from a database. The installer/deinstaller program enables variables to be placed in answer files to represent these fields. The network administrator embeds a special variable for each of these fields into the answer file. Each time a user selects an application program to install, the installer/deinstaller program processes the answer file by replacing the special variables with the appropriate data from the database. In step 420, the installer/deinstaller program processes the answer file in this manner.

The processed answer file is then provided to the SETUP.EXE program. By using answer files to provide input to the SETUP.EXE program, the installer/deinstaller program avoids prompting the user for input and saves the user valuable time. In step 430, the SETUP.EXE program is invoked to install the application program using the answer file.

The network administrator assigns access to the application programs, defines an icon used to represent each application program, provides a brief description of each application program, and identifies special installation instructions. The network administrator provides this information to the installer/deinstaller program. By using the variables, access may be assigned dynamically, so that, for example, an application program appears in the first child window 220 of the user interface only if a computer 100 has more than 16 MB of memory. The network administrator can also automatically select the different optional functions for different groups of users.

Moreover, the network administrator provides the installer/deinstaller program with the number and kind of licenses available for each application program. The installer/deinstaller program uses this information to keep track of a license count to ensure that an application program is installed on computers in the network in accordance with the licenses available. In step 440, the installer/deinstaller program adjusts the license count to indicate that another copy of the application program has been installed at a computer 100.

Moreover, although some application programs support mechanisms for changing configuration parameters directly through the application program, some configuration parameters can only be changed by running the SETUP.EXE program. Complex application programs, such as Microsoft Word, may support many optional functions with optional files. The present invention enables these optional files to be added or removed by running the SETUP.EXE program after the installation of the application program. Again, by using an answer file, the SETUP.EXE program is able to avoid prompting the user for input and saves the user valuable time.

Figure 5:
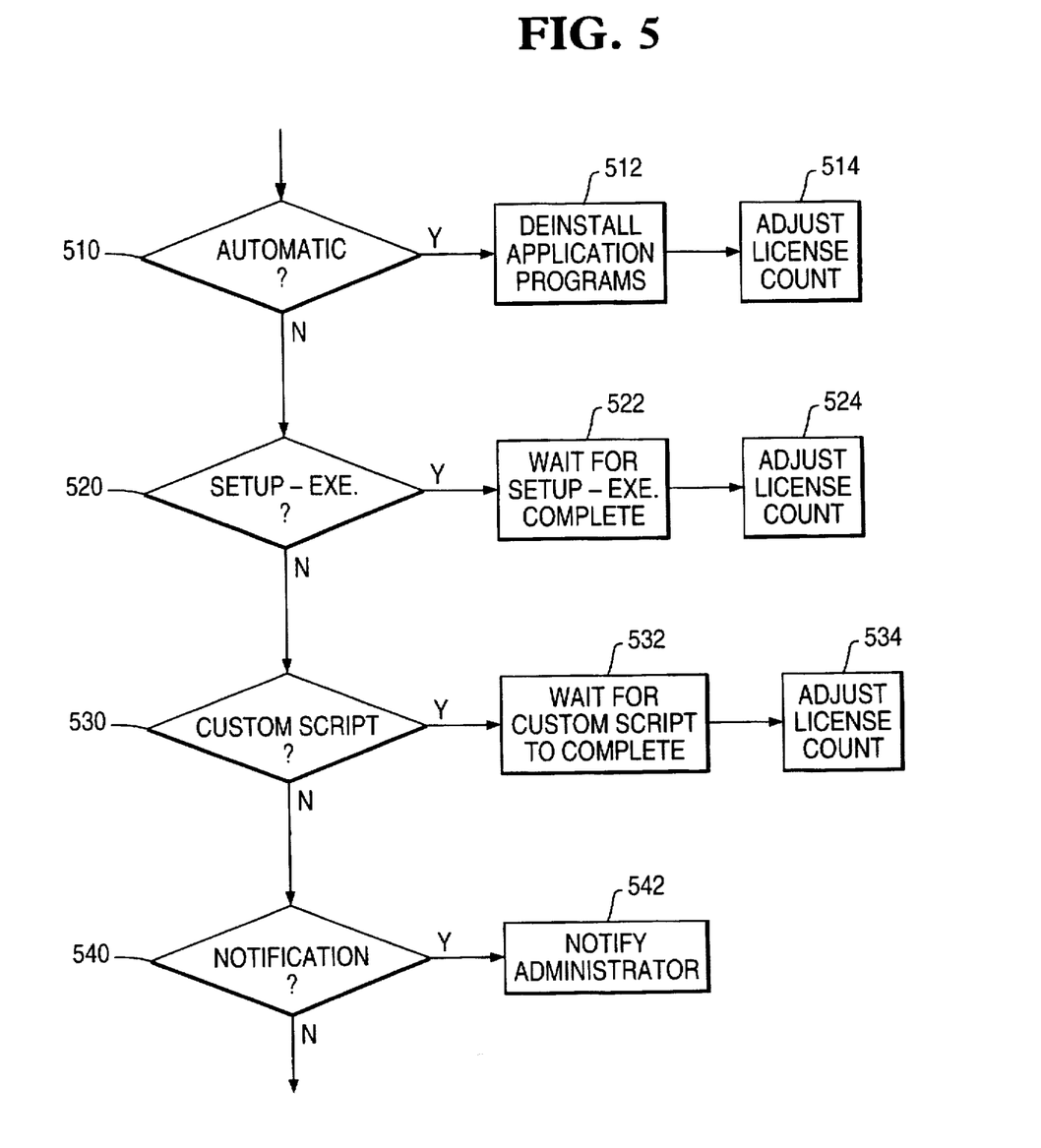
FIG. 5 is a flowchart illustrating the steps required to perform deinstallation.

FIG. 5 is a flowchart illustrating the steps required to perform deinstallation, as identified in step 316. There are four possible deinstallation options are available. The network administrator informs the installer/deinstaller program which deinstallation process to use when a user requests deinstallation of an application program. One deinstallation option provides automatic deinstallation, and the other three options provide updating of information after manual deinstallation.

Step 510 is a decision step in which the installer/deinstaller program determines whether to perform automatic deinstallation. When an application program's SETUP.EXE program does not support deinstallation, the network administrator may invoke the automatic deinstallation. The automatic deinstallation removes the application program and files associated with the application program that are added during installation. The files are stored in the application program's directories in the memory of the computer 100.

When automatic deinstallation has been selected, in step 512, the installer/deinstaller program deinstalls the application program, along with its associated files. The installer/deinstaller program determines which files were added during installation by taking a snapshot of the entire disk directory immediately before installation. The installer/deinstaller program compares this snapshot with another snapshot of the disk directory made immediately before deinstallation to generate a list of added files and renamed files. The differences become the deinstallation list that contains these added and renamed files. The deinstallation process then becomes one of deleting or renaming files on this deinstallation list.

Commonly modified computer configuration files (such as AUTOEXEC.BAT, CONFIG.SYS, WIN.INI, SYSTEM.INI, REGISTRY, etc.) are copied and renamed so changes to them can be recorded during installation. The installer/deinstaller program determines which files were renamed by comparing the sizes of files in the disk directory prior to installation and prior to deinstallation. When the installer/deinstaller program finds two files having similar sizes and different file names, the installer/deinstaller program recognizes that the two files represent the same data and that the file in the disk directory prior to deinstallation is to be replaced with the original file (i.e., the file in the disk directory prior to installation). The installer/deinstaller program then replaces these renamed files with the original (i.e., unchanged) files. The installer/deinstaller program also deinstalls the added files on the deinstallation list. In step 514, after the deinstallation process is finished, the installer/deinstaller program adjusts the license count to reflect the application program has been deinstalled.

Automatic deinstallation may delete files associated with an application program that contain user data, such as configuration files. Also, the installer/deinstaller program must run by itself, or block the creation of files by any other process running, so that files created during installation by other processes are not put on the deinstallation list.

Step 520 is a decision step in which the installer/deinstaller program determines whether the SETUP.EXE program will perform installation. If the SETUP.EXE program supports deinstallation, then the application program's SETUP.EXE program performs deinstallation. In step 522, the installer/deinstaller waits for the SETUP.EXE program to complete. In step 524, the installer/deinstaller program adjusts the license count.

Step 530 is a decision step in which the installer/deinstaller program determines whether a custom script is available for deinstallation. The network administrator has the option of creating a custom script or executable to perform deinstallation. The custom script may be a batch file, a Microsoft Word macro, or other similar script. A custom executable may be Windows™ or DOS (i.e., this is most suitable for in-house application programs). When it is determined that a custom script or executable has been invoked, in step 532, the installer/deinstaller program waits for the custom script or executable to complete. In step 534, the installer/deinstaller program adjusts the license count.

Step 540 is a decision step in which the installer/deinstaller program determines whether to notify the network administrator that a user has requested deinstallation. If the SETUP.EXE program does not support deinstallation, the network administrator does not want the automatic deinstallation, or the network administrator cannot write a custom script to deinstall the application program, then the network administrator can request notification. In step 542, the installer/deinstaller program provides this notification. In particular, when the user deinstalls the application program, the installer/deinstaller program simply mails the network administrator a message, or notifies the network administrator directly through the administration routine of the installer/deinstaller program. The network administrator manually performs deinstallation. Also, with the notification option, the installer/deinstaller program does not adjust the license count. Instead, the network administrator manually adjusts the license count after performing steps to ensure that the application program has been deinstalled from the computer 100.

Conclusion

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A computer-implemented method of installing an application program on a computer from an electronic storage device, the computer having a memory coupled thereto for storing the application program, the method comprising the steps of:

transferring the application program from the electronic storage device to the memory coupled to the computer;

processing an answer file located on the electronic storage device to avoid prompting a user for options; and installing the transferred application program at the computer using the processed answer file.

2. The method of claim 1, wherein the step of transferring the application program comprises the step of copying the application program from the electronic storage device to the memory coupled to the computer.

3. The method of claim 1, wherein the answer file contains installation instructions.

4. The method of claim 1, wherein the answer file contains configuration information relating to the computer.

5. The method of claim 1, wherein the answer file contains configuration information relating to the user.

6. The method of claim 1, wherein a display device and an input device are coupled to the computer, and wherein, prior to the step of transferring the application program, further comprising:

displaying on the display device a first window identifying application programs that can be installed on the computer;

displaying on the display device a second window identifying application programs that have been installed on the computer; and receiving an indication that a user using the input device has dragged one of the application programs from the first window to the second window, thereby indicating that the application program is to be installed on the computer.

7. The method of claim 6, wherein, after the step of installing the application program, further comprising:

receiving an indication that the user using the input device has dragged the installed application program from the second window to the first window, thereby indicating that the application program is to be deinstalled on the computer; and deinstalling the installed application program.

8. The method of claim 1, wherein an input device is coupled to the computer, wherein the application program has associated files, and wherein after the step of installing the application program, further comprising:

receiving an indication from a user using the input device that the application program is to be deinstalled;

determining which files associated with the application program were installed in the memory coupled to the computer when the application program was installed; and removing the determined files associated with the application program from the memory coupled to the computer.

9. The method of claim 8 wherein the step of determining which files associated with the application program were installed when the application program was installed, further comprises:

identifying the files that were available in the memory coupled to the computer prior to the installation of the application program;

identifying the files that were available in the memory coupled to the computer after the installation of the application program; and comparing the identified files to determine which files were installed during the installation of the application program.

10. The method of claim 8 wherein the step of determining which files associated with the application program were installed when the application program was installed, further comprises the step of identifying files that existed prior to the installation of the application program but whose file names have changed after the installation of the application program.

11. The method of claim 10, wherein the step of identifying files that existed prior to the installation of the application program but whose file names have changed, further comprises, the step of renaming the identified files.

12. The method of claim 1, wherein the computer is connected to one or more computers through a network, further comprising, after the step of installing the application program, updating a license count indicating how many computers in the network have installed the application program.

13. The method of claim 1, wherein after the step of installing the transferred application program, further comprising, reinstalling the transferred application program to provide additional functions for that application program.

14. A computer programming apparatus comprising:

a computer having a memory coupled thereto;

an electronic storage device connected through a network to the computer for storing one or more application programs;

means, performed by the computer, for transferring the application program from the electronic storage device to the memory coupled to the computer;

means, performed by the computer, for processing an answer file located on the electronic storage device to avoid prompting a user for options; and means, performed by the computer, for installing the transferred application program at the computer using the processed answer file.

15. The apparatus of claim 14, further comprising:

a display device coupled to the computer;

an input device coupled to the computer;

means, performed by the computer, for displaying on the display device a first window identifying application programs that can be installed on the computer and a second window identifying application programs that have been installed on the computer.

16. The apparatus of claim 15, further comprising means, performed by the computer, for receiving an indication that a user using the input device has dragged one of the application programs from the first window to the second window, thereby indicating that the application program is to be installed on the computer.

17. The apparatus of claim 16, further comprising:

means, performed by the computer, for receiving an indication that the user using the input device has dragged an installed application program from the second window to the first window, thereby indicating that the installed application program is to be deinstalled on the computer; and means, performed by the computer, for deinstalling the installed application program.

18. A program storage device, readable by a computer, tangibly embodying one or more programs of instructions executable by the computer to perform method steps of installing an application program on the computer from an electronic storage device, the computer having a memory coupled thereto for storing the application program, the method comprising the steps of:

transferring the application program from the electronic storage device to the memory coupled to the computer;

processing an answer file located on the electronic storage device to avoid prompting a user for options; and installing the transferred application program at the computer using the processed answer file.

19. The program storage device of claim 18, wherein a display device and an input device are coupled to the computer, and wherein, prior to the step of transferring the application program, further comprising:

displaying on the display device a first window identifying application programs that can be installed on the computer;

displaying on the display device a second window identifying application programs that have been installed on the computer; and receiving an indication that a user using the input device has dragged one of the application programs from the first window to the second window, thereby indicating that the application program is to be installed on the computer.

20. The program storage device of claim 19, wherein, after the step of installing the application program, further comprising:

receiving an indication that the user using the input device has dragged the installed application program from the second window to the first window, thereby indicating that the application program is to be deinstalled on the computer; and deinstalling the installed application program.

21. The program storage device of claim 18, wherein the computer is connected to one or more computers through a network, further comprising, after the step of installing the application program, updating a license count indicating how many computers in the network have installed the application program.

* * * * *

Disclaimer

5,953,532—Mark Allan Lochbaum, Springdale, SC. INSTALLATION AND DEINSTALLATION OF APPLICATION PROGRAMS. Patent dated September 14, 1999. Disclaimer filed by the assignee April 27, 2005, NCR Corporation.

Hereby disclaims and dedicates to the public the entire term of Patent No. 5,953,532.

*(Official Gazette, July 26, 2005)*